Oct. 27, 1925.　　　　　　　　　　　　　　　　　　1,559,408
T. W. CLARKE
VALVE GRINDING MACHINE
Filed July 14, 1923　　　　4 Sheets-Sheet 1
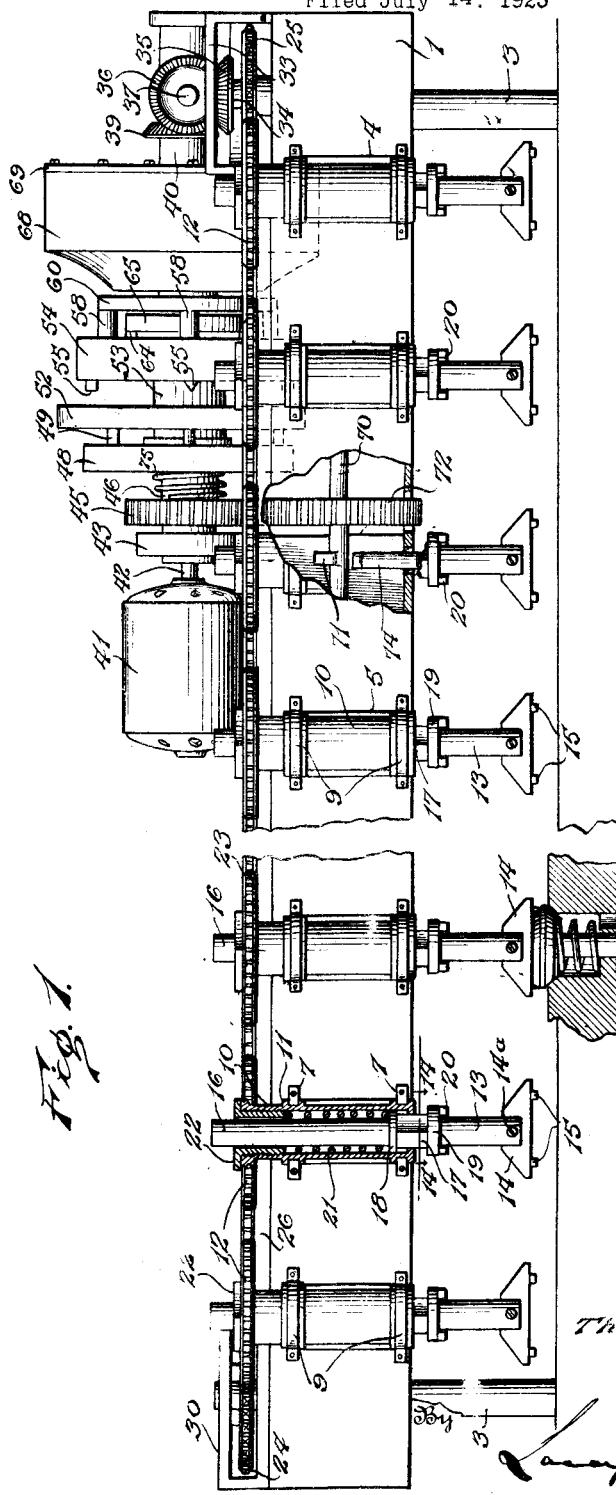
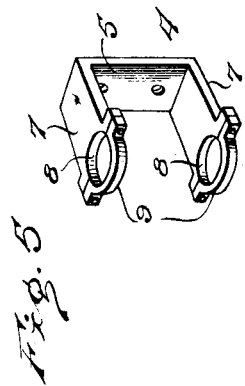
Inventor
Thomas W. Clarke

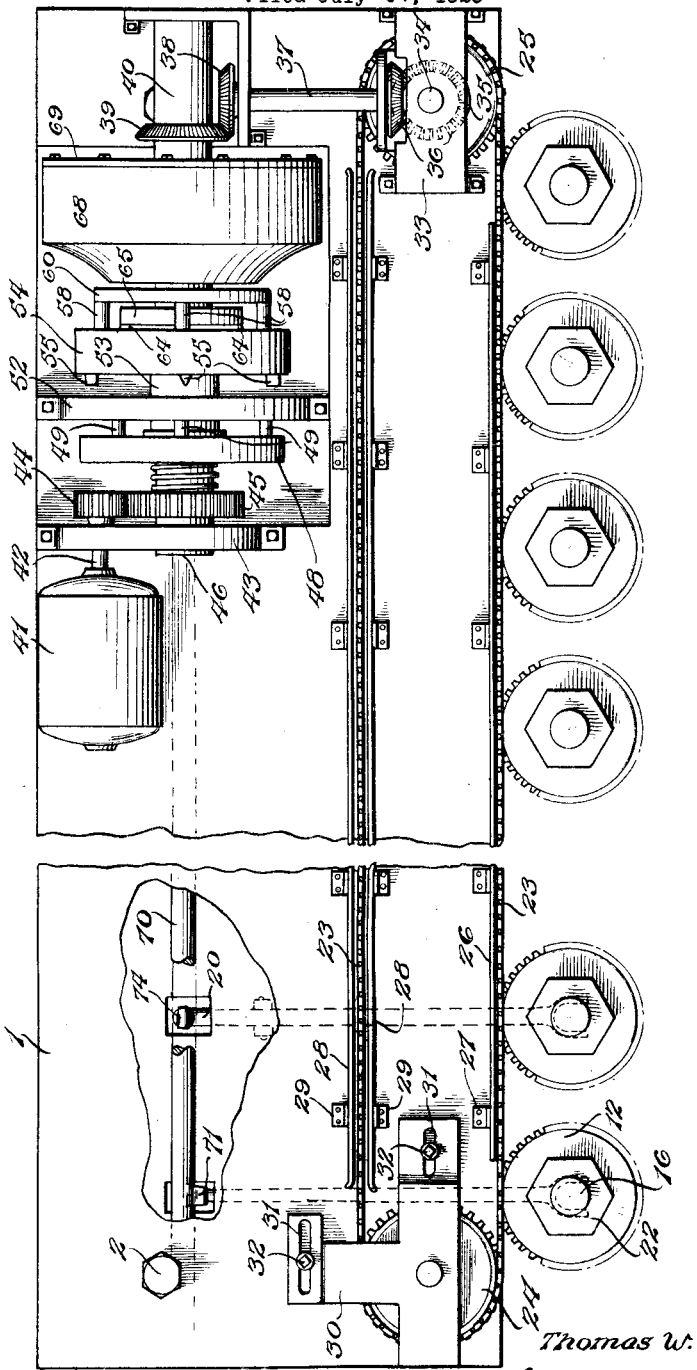

Oct. 27, 1925.

T. W. CLARKE

VALVE GRINDING MACHINE

Filed July 14, 1923     4 Sheets—Sheet 3

1,559,408

Inventor

Thomas W. Clarke

By Lacey & Lacey, Attorneys

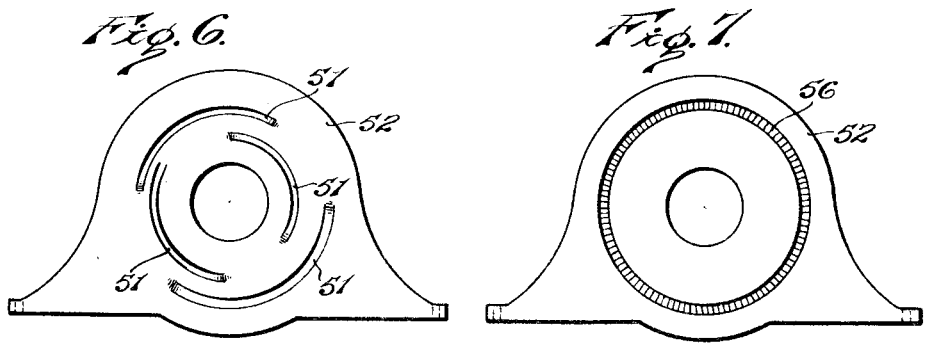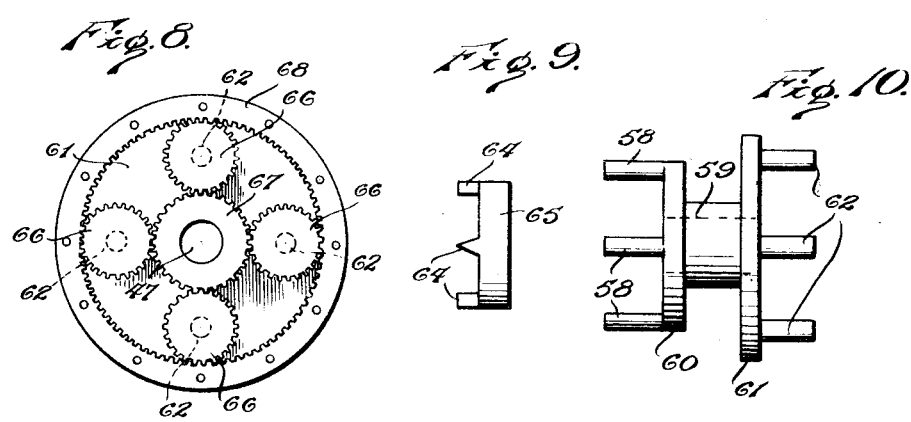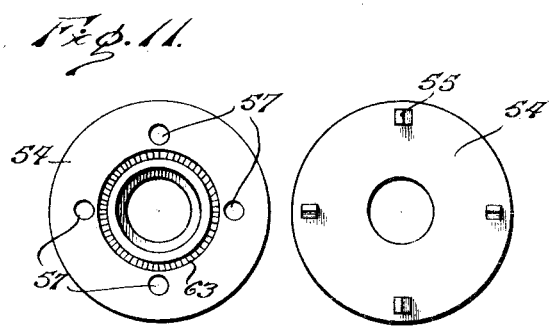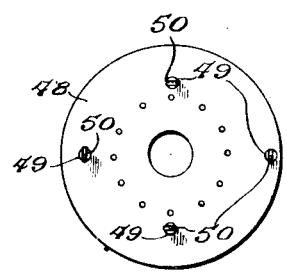

Patented Oct. 27, 1925.

1,559,408

UNITED STATES PATENT OFFICE.

THOMAS W. CLARKE, OF SEATTLE, WASHINGTON.

VALVE-GRINDING MACHINE.

Application filed July 14, 1923. Serial No. 651,567.

*To all whom it may concern:*

Be it known that I, THOMAS W. CLARKE, a citizen of the United States, residing at Seattle, in the county of King and State of Washington, have invented certain new and useful Improvements in Valve-Grinding Machines, of which the following is a specification.

This invention relates to means for grinding the valves of internal combustion engines and has for its object the provision of a machine which will be automatic in operation and which will turn the valves alternately in opposite directions upon their seats, and at intervals lift the valves from the seats to prevent the formation of scratches extending entirely around the valves and their seats. The invention also has for its object the provision of means whereby the valve-turning members may be easily removed when desired so as to adapt the machine to operate upon a greater or less number of valves simultaneously, and a still further object of the invention is to provide means whereby the valve-turning members will be yieldably held in their lowered positions and held in engagement with the respective valves under any desired pressure. The invention also seeks to provide means whereby the direction of rotation of the valves will be automatically reversed and the driving gearing arranged in compact form in such position relative to the working members that no interference will occur between any of the driving parts and the work-performing parts. Other incidental objects of the invention will appear in the course of the following description and the invention resides in certain novel features which will be particularly pointed out in the claims following the description.

The invention is illustrated in the accompanying drawings, in which—

Figure 1 is a front elevation, with parts in section, of a valve-grinding machine embodying the invention;

Fig. 2 is a plan view of the same;

Fig. 5 is a detail perspective view of one of the brackets which support the valve-turning devices;

Figs. 6 to 13 inclusive are detail views of the members of the driving and reversing mechanism;

Fig. 14 is a detail section on the line 14—14 of Fig. 1.

Figure 3:
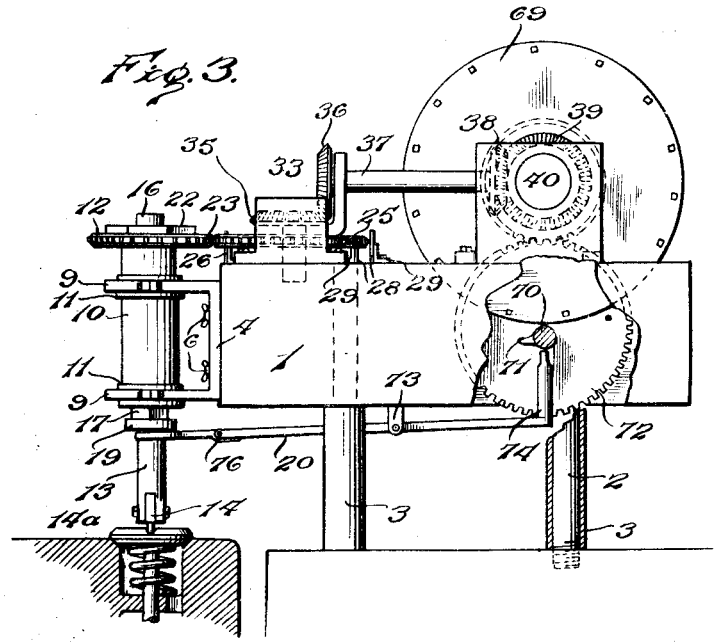
Fig. 3 is an end elevation.

In carrying out my present invention, I employ a table or frame 1 which may be of any suitable dimensions and form and is to be secured to the cylinder block of the engine by bolts 2 or similar devices inserted through the frame or table 1 into the cylinder block, and held out of contact with the cylinder block by spacing sleeves 3 fitted around the bolts between the cylinder block and the frame, as will be readily understood upon reference to Fig. 3. Upon the front side of this frame or main block 1, I secure a plurality of brackets 4 which, as shown most clearly in Figs. 3 and 5 consist of an intermediate back plate or upright member 5 through which set bolts 6 may be inserted into the frame 1, and forwardly projecting arms 7 extending from the upper and lower ends of the back plate. The front ends of the arms 7 are notched or recessed, as shown at 8, and retaining plates 9 of mating form are secured to the front ends of said arms, as clearly shown, the valve-engaging and turning members being rotatably supported within the said notches 8 and by the said clamping plates 9, as will be readily understood. It will thus be seen that the device is adapted to act upon any engine in which the cylinders are arranged in a straight line and it may be operated to simultaneously grind any number of valves. The set bolts 6 permit any bracket to be removed if a rearrangement of the valve-turning members is desirable or if it should be necessary to repair or renew any of said members.

The valve-turning devices each comprises a tubular casing or sleeve 10 provided upon its exterior in vertically spaced relation with grooved flanges 11 with which the arms 7 and the retaining plates or bars 9 are engaged so that, while the said casing will be held against vertical movement, it may rotate horizontally about its own vertical axis. The lower end of the casing 10 is closed and is provided with an angular opening therethrough, while the upper end of the casing is open and has a sprocket wheel 12 formed on or secured around the same. Fitted within the casing 10 and extending through the ends of the same is a valve-turning spindle or bit 13 having a head 14 at its lower end which is provided with lugs 15 to engage corresponding recesses formed in the valve whereby rotation or oscillation of the spindle or bit, while the said lugs engage the recesses in the valve, will effect rotation or oscillation of the valve. The head 14 is flatsided to fit within the slitted lower end of the spindle and be secured by a bolt 14ᵃ, as will be understood from Figs. 1 and 3. This construction permits heads of different detail configuration to be interchangeably used according to the style of the particular valve to be ground. The upper portion of the spindle or bit is circular in cross section, as indicated at 16, while an intermediate portion of said spindle is of angular cross section, as shown at 17, whereby it may slidably engage an angular opening in the lower end of the casing 10 so that the rotation or oscillation of the casing will be imparted directly to the spindle or bit and vertical sliding movement of the bit will be permitted. Above and below the angular portion 17 of the spindle, collars or abutments 18 and 19 are provided upon the spindle, the lower collar 19 resting upon the front forked end of a lever 20 so that when said lever is rocked, the drill or spindle will be raised. A spring 21 is coiled around the circular portion 16 of the spindle within the casing 10 and between the abutment or collar 18 and an adjusting nut 22 fitted in the upper end of the casing. It will be readily understood that, by properly adjusting the nut 22, the tension of the spring may be regulated as desired so that the proper pressure will be exerted to hold the spindle or bit in engagement with the valve to be ground.

The valve-turning or oscillating members are duplicates in construction and arrangement of their parts and it will be understood that the description just given applies equally to all of said members. The sprockets 12 at the upper ends of the casings 10 are all driven by a sprocket chain 23 which is disposed longitudinally of the frame 1 at the top of the same and has its front run disposed immediately over the front edge of the frame so that it will mesh with all the sprockets 12, as will be readily understood upon reference to Fig. 2 of the drawings. The bights or end portions of the sprocket chain are trained around sprockets 24 and 25 and the front run of the chain is held to the sprockets 12 by a guide rail 26 secured upon the top of the frame 1 by brackets or lugs 27 of any convenient construction. The rear run of the chain is likewise guided and held against flexing by parallel guide rails 28 secured upon the top of the frame 1 by brackets 29 corresponding to the brackets 27, as will be readily understood. The sprocket 24 is mounted in a bearing bracket 30 which is preferably T-shaped in plan view and is provided with slots 31 at the ends of its stem and its head through which bolts 32 are inserted into the top of the frame to secure the bracket in place. This arrangement permits the bearing bracket to be shifted longitudinally of the frame so as to compensate for wear in the sprocket chain 23 and maintain the same in a taut condition at all times. The driving sprocket 25 is mounted within a bearing bracket 33 fixed upon the top of the frame 1 at the end thereof distant from the bearing bracket 30, and upon the shaft 34 of the said sprocket 25 is secured a beveled gear 35 with which meshes a beveled gear 36 on the front end of a transmission shaft 37 mounted in suitable bearing brackets upon the frame and arranged in rear of the beveled gears 35 and 36, as will be readily understood. Upon the rear end of the shaft 37 is a beveled gear 38 which meshes with a beveled gear 39 secured upon a driving shaft 40. The shaft 40 is disposed at a right angle to the shaft 37, as shown most clearly in Fig. 2, and is driven preferably by an electric motor 41 through an automatic reversing system of gearing which I will now proceed to describe. The motor 41 is preferably an electric motor as such a motor is compact in form and may be placed directly upon the frame 1 as illustrated.

Figure 4:
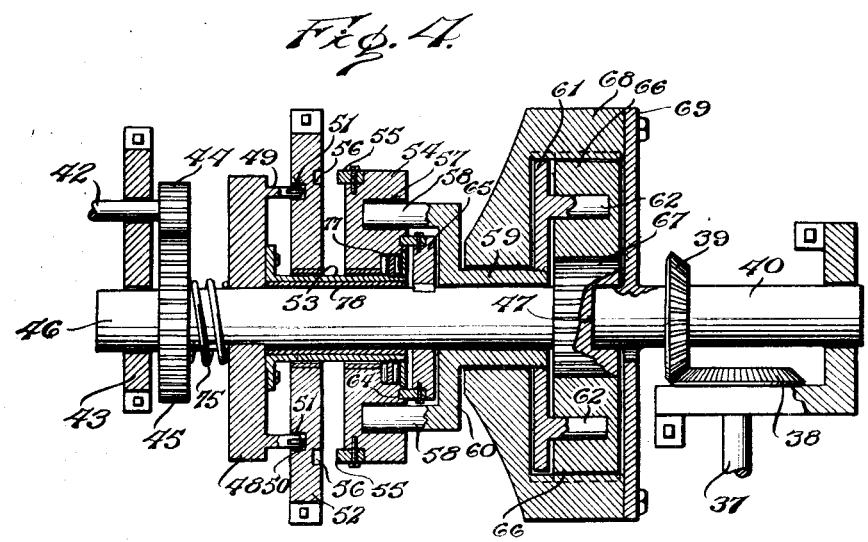
Fig. 4 is a horizontal section through the driving and reversing mechanism.

The motor shaft 42 extends through a bearing bracket 43, secured upon the frame 1, and carries a pinion 44 upon its outer end which meshes with a gear 45 upon a shaft 46 which is disposed in axial alinement with the shaft 40, as shown most clearly in Fig. 4, and is equipped at its outer end with a central socket 47 receiving the inner end of the said shaft 40. At the outer side of the gear 45, a disc 48 is slidably fitted upon the shaft 46 but is constrained to rotate therewith and from the outer face of the said disc 48 pins 49 project, the said pins being equipped at their outer ends with small rollers, indicated at 50, playing in cam grooves 51 formed in the adjacent opposed face of a stationary standard or support 52. Secured to the outer face of the disc 48 and extending through the support 52 around the shaft 46 is a coupling sleeve 53, said sleeve being provided with annular flanges at its opposite ends and having one of said flanges disposed against and secured to the outer face of the disc 48 and the other of said flanges fitting in an annular recess in the outer face of a second disc 54 through the center of which the sleeve extends, as clearly shown in Fig. 4. An end-thrust bearing may be provided within the recess, as indicated at 77, and a bushing 78 of Babbitt or other metal may be disposed between the shaft 46 and the sleeve 53. The discs 48 and 54 are disposed at opposite sides of the support 52 and the disc 54 is provided with lugs 55 which are adapted to engage recesses or sockets 56 in the adjacent opposed face of the support 52, as will be readily understood. In its face remote from the support 52, the disc 54 is provided with a plurality of sockets or recesses 57 and these sockets are adapted to be engaged by pins 58 at one end of a gear-carrying frame, said frame consisting of a hub or sleeve 59 fitted about the shaft 46 and heads 60 and 61 at the ends of the said hub. The pins 58 project from the head 60, as clearly shown, at the edge thereof, while from the outer face of the head 61, but spaced radially inward from the edge thereof, similar pins 62 project. The disc 54 is further provided in its outer face, concentric with the sockets 57 but disposed upon a shorter radius, with an annular series of sockets or recesses 63 which are adapted to be engaged by the pins or lugs 64 upon a locking disc 65 which is keyed upon the shaft 46 between the disc 54 and the head 60 of the gear-carrying frame. The recesses or sockets 56 and 63 are arranged in continuous circular series so that there will be no slipping interval in which the dogs 55 or 64 seek to engage the respective sockets and the dogs are preferably wedge-shaped so that they will readily engage the sockets. The dogs are preferably removable and held by set screws so that they may be easily renewed when broken or worn out. Upon each pin 62 of the gear-carrying frame is mounted a pinion 66 which is adapted to rotate at times about its respective pin 62 as an axis and each pin 66 meshes with a gear 67 formed upon or secured on the outer end of the shaft 46 about the socket 47 which receives the inner end of the shaft 40. The several pinions 66 and the head 61 as well as the hub 59 are housed by and within an internal gear 68, the interior of which is shaped to fit around the hub 59 and the head 61, as will be readily understood on reference to Fig. 4. The outer end of the internal gear 68 is closed by a cover plate or flange 69 which may be formed integral with the shaft 40 or may be rigidly united therewith in any preferred manner. Obviously, the shaft 40 and the cover plate or flange 69 will constitute a single unit and will revolve together.

A cam shaft 70 is suitably journaled within the frame 1 and extends from end to end thereof, being equipped with a cam 71 in the vertical plane of each valve-turning member and also equipped with a gear 72 meshing with and driven by the gear 45 upon the shaft 46. Each lever 20 is fulcrumed intermediate its ends upon a bracket 73 on the under side of the frame 1 and at its rear end carries an upstanding arm 74 upon the upper end of which rides one of the cams 71. The high part of the cam during the rotation of the shaft will depress the rear end of the respective lever 20 and thereby raise the front end thereof so that the valve-engaging head 14 will be lifted and the valve will be raised from its seat. As the high part of the cam clears the upstanding arm 74, the spring 21 will expand so as to return the head 14 to its lowest position. The front forked end of the lever is hinged, as at 76, so that it may be raised to permit removal of the valve out of its seat without dismantling the entire machine. The hinge may be of any form which will prevent dropping of the fork.

Upon reference to Fig. 4, it will be noted that the locking disc 65 is fixed to the shaft 46, while the disc 48 is constrained to rotate therewith but may slide longitudinally thereon, a spring 75 holding the disc 48 toward the bracket or support 52. With the parts arranged as shown in Fig. 4, therefore, the disc 54, being engaged by the locking disc 65, will be compelled to rotate with the shaft 46 and the gear-carrying frame will, consequently, also rotate with said shaft so that the pinions 66 will not rotate about their respective axles but will serve merely as couplings to cause the internal gear 68 to rotate in the same direction as the gear 67, and the rotation of the internal gear 68 will be transmitted through the member 69 to the shaft 40 and transmitted from said shaft through the described gearing to the several valve-oscillating members. The pins 49 upon the disc 48 travel in the cam grooves 51 upon the stationary standard or support 52 and will be thereby caused to ride into the plane of the inner face of said standard, the result being that the disc 48 will be shifted longitudinally inwardly upon the shaft 46 and, through the coupling sleeve 53, will draw the disc 54 out of engagement with the locking disc 65 and into engagement with the support 52. The disc 54 will thus be held against further rotation with the shaft 46 and the coupling 53 will turn freely within the said disc 54. The length of the pins or lugs 58 is such that they will at all times be in engagement with the socket 57 in the disc 54 so that, when the said disc is brought into engagement with the support 52 and held against turning as just described, the gear-carrying frame including the heads 60 and 61 and the hub 59 will be also held against turning with the shaft 46. The pinions 66 will then be set in motion through their engagement with the gear 67, and will rotate about their respective axles and cause the internal gear 68 to rotate in a direction the reverse of the direction of rotation of the said gear 67. The shaft 40 and the parts driven thereby will thus be automatically reversed so that the direction of rotation or oscillation of the valves will be reversed. Upon reference to Fig. 6, it will be noted that the cam grooves 51 are about twice as long as the intervening uninterrupted portions of the face of the member 52 so that, while the rollers 50 are riding in the grooves, the valves will be rotated in one direction through two-thirds of a complete revolution and while the rollers are running upon the uninterrupted portion of the face of the standard or support the valves will be turned one-third of a complete revolution in the opposite direction.

It will be readily seen from the foregoing description, taken in connection with the accompanying drawings, that I have provided a very compact machine which will operate automatically to grind the valves of internal combustion engines and which will turn the valves alternately in opposite directions and at intervals will permit the valves to rise from their seats so as to avoid the formation of scratches extending entirely around the valves and their seats, the rising action being timed to occur simultaneously with the reversal of the direction of rotation. The machine is capable of use upon a wide range of engines for grinding the valves without necessitating any material change in its construction or operation and the arrangement of its parts is such that it is not apt to get out of order and may be used for a long period without requiring renewal of any parts.

Having thus described the invention, what is claimed as new is:

1. In a valve-grinding machine, the combination of a supporting frame, a plurality of valve-engaging and turning members mounted upon the frame for vertical sliding movement and for rotation in a horizontal plane, means for rotating said members, means for yieldably holding said members in their lower positions, a cam shaft mounted in the frame, means for rotating said cam shaft, a plurality of levers fulcrumed upon the frame intermediate their ends and each provided at its front end with a fork engaging and supporting one of said valve-engaging members, and pusher arms at the rear ends of the levers engaging the cam shaft.

2. In a valve-grinding machine, the combination of a supporting frame, a plurality of tubular casings mounted upon the frame for oscillatory movement, means acting upon the upper ends of said casings to oscillate the same, the lower ends of said casings being closed and having angular openings therethrough, spindles mounted within the casings and having angular portions extending through the angular openings in the lower ends of the casings, means carried by the lower ends of said spindles to engage the valves to be ground, abutments on the spindles above and below the angular portions thereof, a vertically movable support for each spindle engaging under the lower abutment thereon, means for vibrating said support at intervals, a spring coiled around the spindle within the casing and bearing upon the upper abutment thereon, and a tension nut fitted in the upper end of the casing and bearing upon said spring.

3. In a valve-grinding machine, the combination of a supporting frame, a plurality of valve-engaging and turning members mounted on the frame, a motor on the frame in rear of said members, a shaft driven by said motor, a second shaft in axial alinement with the first-mentioned shaft, gearing connecting the second shaft with the valve-engaging and turning members, and gearing connecting the axially alined shafts whereby to cause the same to rotate simultaneously and alternately in the same and opposite directions.

4. In a valve-grinding machine, the combination of a supporting frame, a plurality of valve-engaging and turning members mounted on the frame, a motor-driven shaft mounted on the frame in rear of the said members, a second shaft axially alined with the motor-driven shaft and operatively connected with the valve-engaging and turning members, a pinion on the motor-driven shaft, an internal gear carried by the second shaft, a frame mounted upon the motor-driven shaft, a plurality of pinions carried by said frame and meshing with the pinion on said shaft and with the internal gear carried by the second shaft, and means for alternately locking said frame to the motor-driven shaft and releasing said frame from said shaft.

5. In a valve-grinding machine, the combination of a supporting frame, a plurality of valve-engaging and turning members mounted on said frame, a motor-driven shaft mounted on the frame in rear of said members, a second shaft alined axially with the motor-driven shaft, operative connections between the second shaft and the valve-engaging and turning members, a stationary support through which the motor-driven shaft passes provided with a plurality of cam grooves in one face, a disc mounted upon the motor-driven shaft to rotate therewith and slidable longitudinally thereof, a plurality of projections on said disc running in the cam grooves on said stationary support, a second disc encircling the shaft at the opposite side of said support, a locking disc secured to the shaft and adapted to engage said second disc, a sleeve coupling the first-mentioned disc and the second-mentioned disc whereby the second-mentioned disc may be caused to engage the stationary support at intervals, said second-mentioned disc being provided with sockets in its face remote from said support, a pinion carried by the motor-driven shaft, a frame encircling the said shaft and provided at one end with lugs engaging the sockets in the second-mentioned disc, pinions carried by the opposite end of said frame and meshing with the pinion on the shaft, and an internal gear carried by the second shaft and meshing with the pinions on said frame.

6. In a valve-grinding machine, the combination of a supporting frame, a plurality of valve-engaging and turning members mounted on the frame, a motor-driven shaft mounted on the frame in rear of the said members, a second shaft axially alined with the motor-driven shaft and operatively connected with the valve-engaging and turning members, a pinion on the motor-driven shaft, an internal gear carried by the second shaft, a frame mounted upon the motor-driven shaft, a plurality of pinions carried by said frame and meshing with the pinion on said shaft and with the internal gear carried by the second shaft, means for alternately locking said frame to the motor-driven shaft and releasing said frame from said shaft, and means for locking the frame against rotation when released from the shaft.

7. In a valve-grinding machine, the combination of a supporting frame, a plurality of valve-engaging and turning members mounted on said frame, a motor-driven shaft mounted on the frame in rear of said members, a second shaft alined axially with the motor-driven shaft, operative connections between the second shaft and the valve-engaging and turning members, a stationary support through which the motor-driven shaft passes provided with a plurality of cam grooves in one face, a disc mounted upon the motor-driven shaft to rotate therewith and slidable longitudinally thereof, a plurality of projections on said disc running in the cam grooves on the stationary support, a second disc encircling the shaft at the opposite side of said support, a locking disc secured to the shaft and adapted to engage said second disc, a sleeve coupling the first-mentioned disc and the second-mentioned disc whereby the second-mentioned disc may be caused to engage the stationary support at intervals, said second-mentioned disc being provided with sockets in its face remote from said support, a frame encircling the motor-driven shaft and provided at one end with lugs engaging the sockets in the second-mentioned disc, and gearing carried by said frame and the alined shafts whereby the second shaft will be driven by the motor-driven shaft alternately in opposite directions.

In testimony whereof I affix my signature.

THOMAS W. CLARKE. [L. S.]